US011493164B2

(12) United States Patent
Chuang et al.

(10) Patent No.: US 11,493,164 B2
(45) Date of Patent: Nov. 8, 2022

(54) STRUCTURE FORMED BY TEMPERATURE DIFFERENCE, METHOD OF FORMING THE STRUCTURE, AND LIGHTWEIGHT RIGID ASSEMBLY COMPRISING THE STRUCTURE

(71) Applicant: Mintron Energy Technology Co., Ltd., Taoyuan (TW)

(72) Inventors: Chia-Ming Chuang, Taoyuan (TW); Chen-Sheng Huang, Taoyuan (TW)

(73) Assignee: Mintron Energy Technology Co., Ltd., Taoyuan (TW)

( * ) Notice: Subject to any disclaimer, the term of this patent is extended or adjusted under 35 U.S.C. 154(b) by 198 days.

(21) Appl. No.: 16/821,216

(22) Filed: Mar. 17, 2020

(65) Prior Publication Data

US 2020/0332941 A1 Oct. 22, 2020

(30) Foreign Application Priority Data

Apr. 19, 2019 (TW) .................................. 108113864

(51) Int. Cl.
*F16M 11/00* (2006.01)
(52) U.S. Cl.
CPC .................................. *F16M 11/00* (2013.01)
(58) Field of Classification Search
CPC ..... F16M 11/00; B23P 11/025; B21D 39/046; B60K 1/04
USPC .................................. 428/398; 248/519, 127
See application file for complete search history.

(56) References Cited

U.S. PATENT DOCUMENTS

| 5,536,126 | A | 7/1996 | Gross |
| 6,260,858 | B1 | 7/2001 | DeLucia |
| 7,217,059 | B1 | 5/2007 | Rudduck |
| 8,579,535 | B2 | 11/2013 | Crane et al. |
| 9,003,627 | B1 * | 4/2015 | Crane ................... F16B 1/0014 29/447 |
| 2011/0073722 | A1 * | 3/2011 | Meuret .................. F16M 11/34 248/169 |
| 2011/0299915 | A1 * | 12/2011 | Crane ................... F16B 1/0014 29/525.01 |
| 2013/0269902 | A1 * | 10/2013 | Loukus ................. B22D 17/22 156/308.2 |

(Continued)

FOREIGN PATENT DOCUMENTS

JP 2016-180497 A 10/2016

*Primary Examiner* — Muhammad Ijaz
(74) *Attorney, Agent, or Firm* — Wang Law Firm, Inc.

(57) ABSTRACT

A structure formed by temperature difference includes an enveloped part, an enveloping part, and a low heat transfer layer. The enveloped part has a free section and an engagement section. The enveloping part defines at least one holding space corresponding to the engagement section. The holding space is dimensioned to be slightly less than the engagement section and can be thermally expanded to be larger than the engagement section by heating the enveloping part to reach a predetermined temperature difference over the enveloped part, so that the engagement section can be put into the holding space. When the enveloping part is cooled, the holding space can shrink, causing the enveloping part to tightly hold the engagement section. The low heat transfer layer, which has a thermal conductivity less than each of the two parts, is disposed in the holding space, between the engagement section and the enveloping part.

9 Claims, 10 Drawing Sheets

(56) References Cited

U.S. PATENT DOCUMENTS

2020/0408477 A1\* 12/2020 Glisovic ............... C22C 29/065

\* cited by examiner

STRUCTURE FORMED BY TEMPERATURE DIFFERENCE, METHOD OF FORMING THE STRUCTURE, AND LIGHTWEIGHT RIGID ASSEMBLY COMPRISING THE STRUCTURE

FIELD OF THE INVENTION

The present invention relates to a structure formed by temperature difference, a method of forming the structure, and a lightweight rigid assembly comprising the structure.

BACKGROUND OF THE INVENTION

For joining metals, conventional ways such as welding, bonding, and bolted connection can be used. However, the strength at the joint of the metals through these methods is weaker than the metal parts. For example, the most vulnerable location in a vehicle is usually at the welds. Thus, when a vehicle suffers an impact, the welds are the easiest place to break. On the other hand, the process for separating the joined metals is complicated and often leaves the welding or bonding marks on the metals. Bolted connection for metals also encounters some problems, such as thread damages, insufficient thread accuracy, insufficient torque, and loose nut. In addition, conventional equipment used for joining metals is expensive, and the process time is relatively long.

There is another conventional way to join two metal parts. During the joining process, one metal part with a hole can be heated so that the hole can be enlarged to have the other metal part easily inserted therethrough. When the metal part is cooled, the hole can shrink to grip the other metal part. This way of joining metal parts is commonly seen in manufacturing a motor, wherein a rotor element can be heated so that its bore allows a shaft to be inserted therethrough. After the rotor element is cooled, the rotor element and the shaft can be fixed together to become a rotor assembly. However, for dismantling the rotor assembly, reheating the rotor element does not work. Due to thermal conduction between the rotor element and the shaft, the shaft can be affected by heat to expand. As a result, there would be no sufficient gap between the rotor element and the shaft, causing the shaft difficulty being separated from the rotor element.

Also, when two dissimilar metals are contact with each other, due to different reduction potentials thereof, one metal having higher reduction potential would experience a reduction reaction (cathode) while the other metal having lower reduction potential would experience an oxidation reaction (anode). As a result, the joint is significantly weakened over time. On the other hand, two metals being connected by conventional means are electrically conductive with each other, which may cause unnecessary short circuits.

Thus, there is a need to provide a structure that is robust and can be easily assembled and disassembled.

SUMMARY OF THE INVENTION

One object of the present invention is to provide a structure formed by temperature difference, which is robust and can be disassembled easily.

Another object of the present invention is to provide a structure formed by temperature difference, which can avoid corrosion between metals due to galvanic cell effect.

A further object of the present invention is to provide a structure formed by temperature difference, which allows the constituting parts thereof to be electrically insulated or conductive with other.

A still further object of the present invention is to provide a structure formed by temperature difference, which can be assembled quickly and disassembled easily.

A yet still further object of the present invention is to provide a lightweight rigid assembly based on a structure formed by temperature difference, which is robust and not easily deformed by external forces.

A yet still further object of the present invention is to provide a lightweight rigid assembly based on a structure formed by temperature difference, which can be modified easily to be suitable for an application.

A yet still further object of the present invention is to provide a lightweight rigid assembly based on a structure formed by temperature difference, wherein types of parts used to construct the assembly can be reduced, thus reducing the cost of the assembly.

A yet still further object of the present invention is to provide a lightweight rigid assembly based on a structure formed by temperature difference, whereby the operations for assembling/disassembling the rigid assembly can be simplified, thereby increasing the efficiency of the operations.

A yet still further object of the present invention is to provide a lightweight rigid assembly based on a structure formed by temperature difference, wherein the parts constituting the assembly can be configured to be electrically insulated or conductive with each other, and can be protected from corrosion between dissimilar metals due to galvanic cell effect.

To achieve the above objectives, the structure formed by temperature difference of the present invention may comprise an enveloped part, an enveloping part, and a low heat transfer layer. The enveloped part has a free section and an engagement section extending from the free section. The enveloping part defines at least one holding space corresponding to the engagement section of the enveloped part, wherein the holding space is dimensioned to be slightly less than the engagement section of the enveloped part. The holding space can be thermally expanded to be larger than the engagement section of the enveloped part by heating the enveloping part to reach a predetermined temperature difference over the enveloped part, so that the engagement section of the enveloped part can be put into or from the holding space. When the enveloping part is cooled, the holding space thereof can shrink to its original size, causing the enveloping part to tightly hold the engagement section of the enveloped part. The low heat transfer layer, which has a thermal conductivity less than each of the enveloped part and the enveloping part, is disposed in the holding space, between the engagement section of the enveloped part and the enveloping part. As such, the low heat transfer layer can reduce heat transferred from the enveloping part to the enveloped part to facilitate the enveloping part being heated to reach the predetermined temperature difference over the enveloped part.

Contrary to conventional technology, the structure formed by temperature difference employs a low heat transfer layer between an enveloping part and an enveloped part to reduce thermal conduction therebetween. Not only does the low heat transfer layer provide sufficient strength for joining the parts, the layer also increases temperature difference between the parts when being heated so as to facilitate disassembling the structure into separate parts.

The method of forming a structure by temperature difference involves an enveloped part being assembled with an enveloping part, wherein the enveloped part has a free section and an engagement section extending from the free section; the enveloping part defines a holding space corresponding to the engagement section of the enveloped part; a low heat transfer layer, having a thermal resistivity greater than each of the enveloped part and the enveloping part, is disposed in the holding space, between the engagement section of the enveloped part and the enveloping part. The method comprises the steps of: (a) heating the enveloping part to expand the holding space thereof such that the holding space has a dimension greater than a total of the engagement section of the enveloped part and the low heat transfer layer; (b) placing the engagement section of the enveloped part together with the low heat transfer layer in the holding space of the enveloping part, wherein the low heat transfer layer is located between the engagement section of the enveloped part and the enveloping part to reduce thermal conduction therebetween; and (c) cooling the enveloping part to shrink the holding space such that the enveloping part tightly holds the low heat transfer layer and the engagement section of the enveloped part. With the method, a robust structure can be constructed easily, and can be disassembled easily.

The lightweight rigid assembly of the present invention may comprise a plurality of enveloped parts, a plurality of enveloping parts, and a plurality of low heat transfer layers. Each of the enveloped parts has a free section and an engagement section extending from the free section. Each of the enveloping parts defines a holding space corresponding to the engagement section of one of the enveloped arts, wherein the holding space is dimensioned to be slightly less than the engagement section of the enveloped part. The holding space can be thermally expanded to be larger than the engagement section of the enveloped part by heating the enveloping part to reach a predetermined temperature difference over the enveloped part, so that the engagement section of the enveloped part is movable into or from the holding space. When the enveloping part is cooled, the holding space shrinks to its original size to have the enveloping part tightly hold the engagement section of the enveloped part. Each of the low heat transfer layers, having a thermal conductivity less than each of the enveloped part and the enveloping part, is disposed in a holding space, between the corresponding enveloped part and the corresponding enveloping part, so that the low heat transfer layer reduces heat transferred from the enveloping part to the enveloped part, thus facilitating the enveloping part being heated to reach the predetermined temperature difference over the enveloped part. Thus, the enveloped parts and the enveloping parts are configured to form a three-dimensional support frame.

According to the present invention, enveloping parts and enveloped parts together with low heat transfer layers can be used to construct a 3-dimensional rigid assembly, which is lightweight, robust and simple, and can be easily modified to be suitable for an application, thus increasing applicability. With the present invention, a structure can be assembled/disassembled easily and quickly, which can solve disadvantages of conventional technology, wherein types of parts used to construct the structure can be reduced, thus reducing the cost of the structure. Furthermore, the low heat transfer layers can be formed of a suitable material to avoid corrosion due to galvanic cell existing between two dissimilar metals, and to allow the enveloping parts to be electrically insulated or conductive with the enveloped parts.

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The foregoing and other technical contents, features and advantages of the present invention will be illustrated in detail by way of exemplary embodiments in the following paragraphs with reference to the accompanying drawings.

The drawings accompanied with the specification show the structural features of elements used in the present invention, which may be depicted in a size or proportion to be easily understood by those skilled in the art without changing the subject matter of the present invention.

Figure 1:
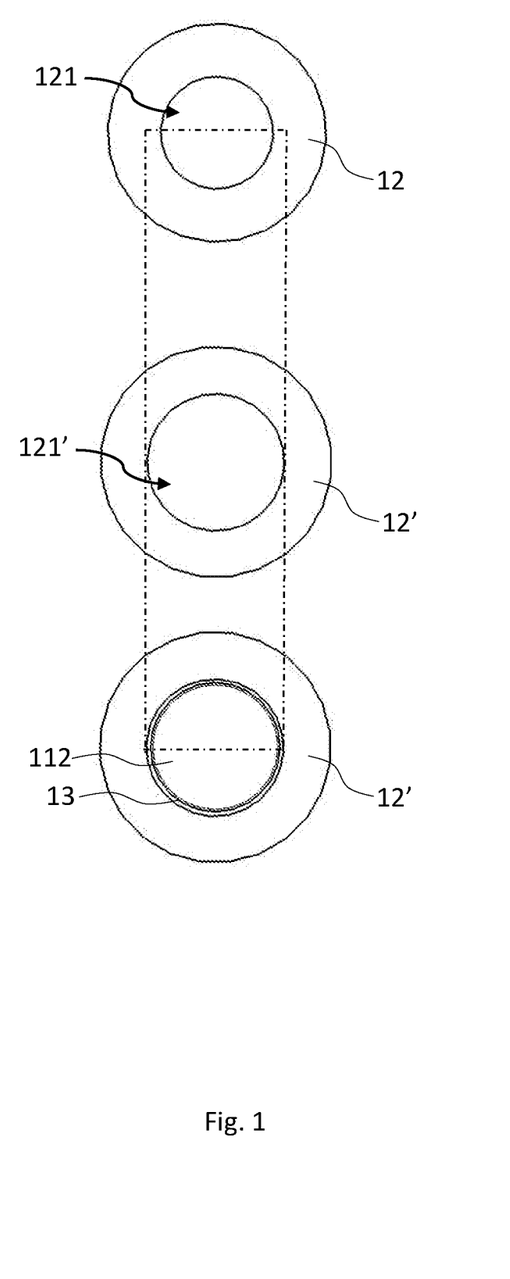
FIG. 1 shows a schematic view of a first embodiment of a structure formed by temperature difference according to the present invention.
Figure 2:
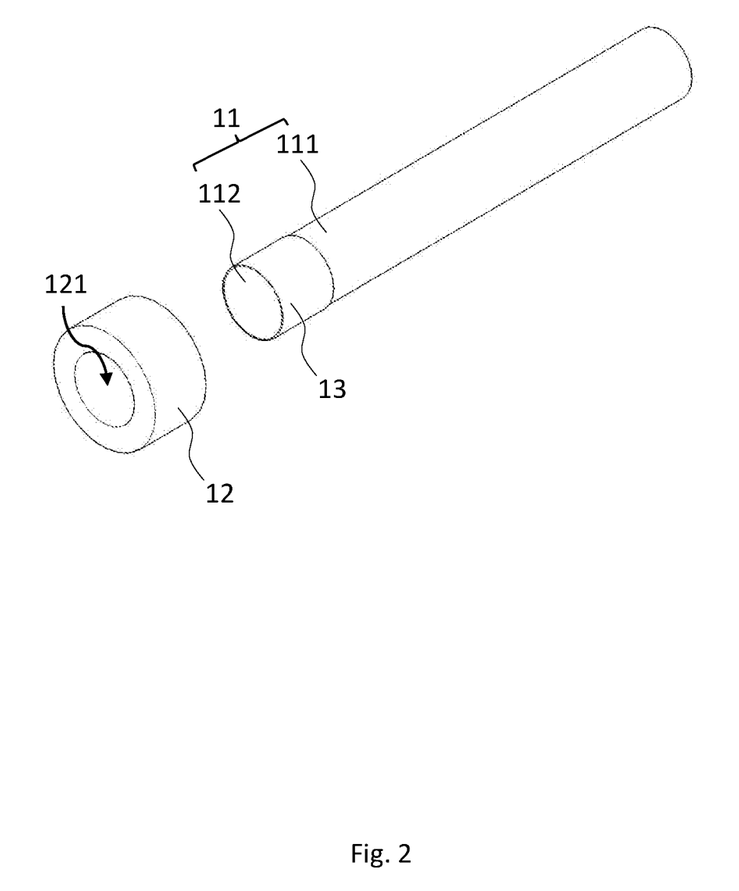
FIG. 2 shows a 3-dimensional view of the first embodiment of FIG. 1, wherein two parts of the structure are not yet assembled.
Figure 3:
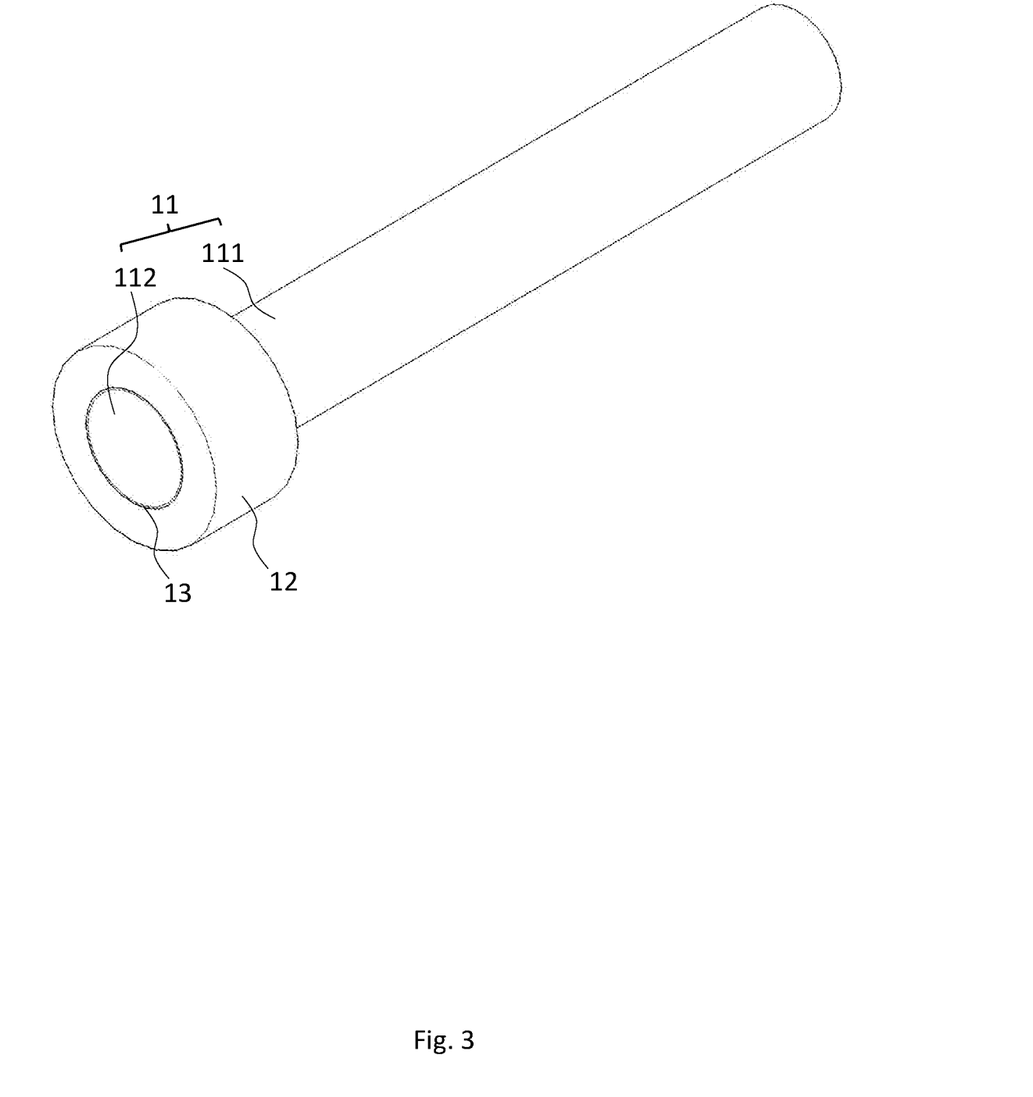
FIG. 3 shows a 3-dimensional view of the first embodiment of FIG. 1, wherein two parts of the structure are assembled together.

FIGS. 1 through 3 show a first embodiment of a structure formed by temperature difference according to the present invention. The structure generally comprises an enveloped part 11 and an enveloping part 12. The enveloped part 11, which is in the form of a cylindrical body, includes a free section 111 and an engagement section 112 extending from the free section 111, wherein a low heat transfer layer 13 having a high thermal resistivity can be formed on the outer surface of the engagement section 112, through an anodizing process or chemical vapor deposition. For example, the low heat transfer layer 13 can be formed of zirconia ceramics, the thermal resistivity of which is about 18 times the thermal resistivity of iron. Due to the extremely high electrical resistance and breakdown voltage of zirconia ceramics, a part made thereof can provide good thermal and electrical insulation.

The enveloping part 12 is an annular metallic body, which defines a holding space 121 having a radius slightly less than the sum of the radius of the engagement section 112 of the enveloped part 11 and the thickness of the low heat transfer layer 13. When the enveloping part 12 is heated to reach a predetermined temperature difference over the enveloped part 11, the enveloping part as well as the holding space thereof can be expanded (see reference numerals 12', 121' in FIG. 1), so that the engagement section 112 of the enveloped part 11 is allowed to enter the holding space 121'. When the enveloping part 121' is cooled down such that the temperature difference between the two parts is less than the predetermined temperature difference, the holding space 121' can shrink to its original size (see reference numeral 121), the enveloping part 12 can tightly hold the engagement section 112 of the enveloped part 11.

The predetermined temperature difference serves as a reference to decide whether the enveloped part is tightly or loosely fitted with the enveloping part. When the temperature difference between the enveloping part and the enveloped part is greater than the predetermined temperature difference, the engagement section of the enveloped part is allowed to enter the holding space of the enveloping part. When the temperature difference between the enveloping part and the enveloped part is less than the predetermined temperature difference, the enveloped part can be held tightly in the holding space of the enveloping part.

For separating the enveloped part 11 from the enveloping part 12, the enveloping part 12 can be heated to enlarge the holding space 121. The low heat transfer layer 13 on the surface of the engagement section 112 of the enveloped part 11 has a thermal resistivity higher than each of the enveloped part 11 and the enveloping part 12. As such, the low heat transfer layer 13 functions as a thermal barrier, causing the enveloped part 11 not easy to receive heat from the enveloping part 12. Consequently, the enveloped part 11 can be prevented from thermal expansion and thus can be easily separated from the enveloping part 12.

Figure 4:
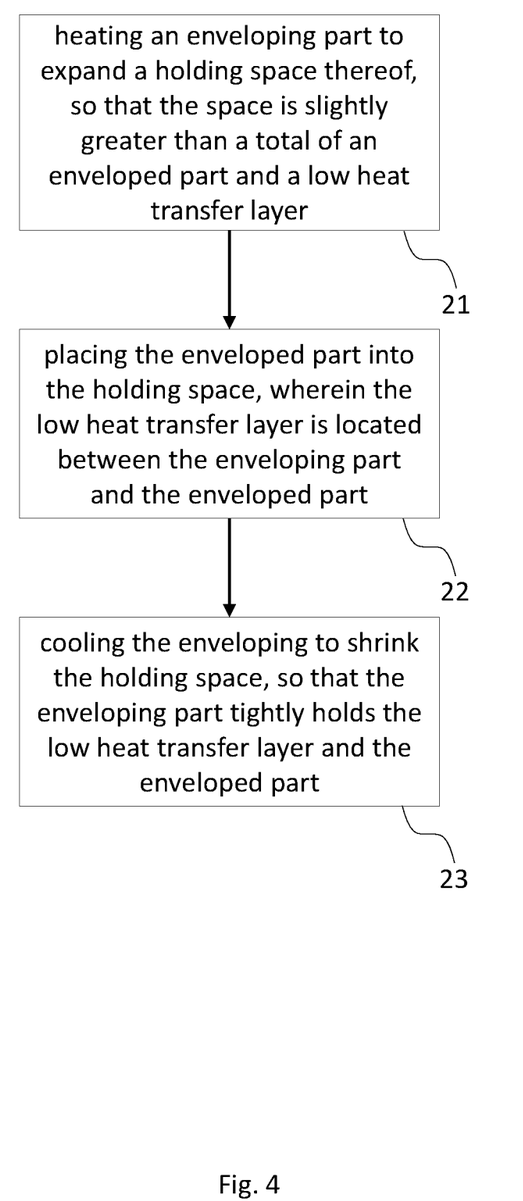
FIG. 4 shows a flowchart illustrating a method of forming a structure by temperature difference according to the present invention.

FIG. 4 shows a flowchart that illustrates a method of forming a structure by temperature difference. In step 21, an enveloping part can be heated such that a holding space thereof is expanded to the extent of being slightly greater than a total of an enveloped part and a low heat transfer layer formed on an engagement section of the enveloped part. For example, the enveloping part can be placed in a high-temperature oven that performs a heating process. Optionally, at the same time, the enveloped part can be placed in a freezer to reduce its volume, thus increasing the gap between the enveloping part and the enveloped part. In step 22, the engagement section of the enveloped part together with the low heat transfer layer can be placed into the holding space, wherein the low heat transfer layer is located between the enveloping part and the engagement section of the enveloped part to reduce thermal conduction between the enveloping part and the enveloped part. In step 23, the enveloping part can be cooled down in a normal temperature environment or even in a freezer so that the holding space thereof can shrink to its original size, and thus the enveloping part can tightly hold the low heat transfer layer as well as the engagement section of the enveloped part.

Figure 5:
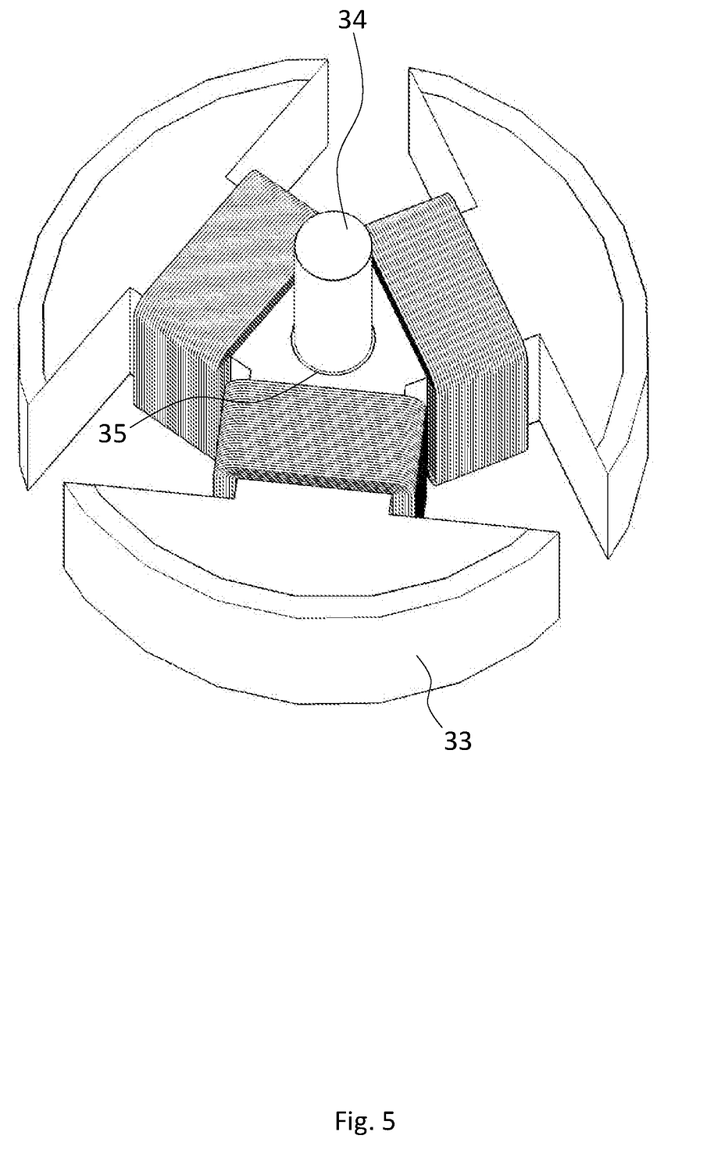
FIG. 5 shows a schematic view of a second embodiment of the structure formed by temperature difference.

FIG. 5 shows a second embodiment of the structure formed by temperature difference, wherein the structure is configured as a rotor assembly used in a motor. The rotor assembly is composed of a rotor element 33 and a shaft 34, wherein the rotor element 33 is referred to as an enveloping part that defines a bore, while the shaft 34 is referred to as an enveloped part. An inner surface of the rotor element 33 defining the bore is coated with a low heat transfer layer 35, such as phenolic resin, which has a high heat capacity, several times of that of iron. In assembling the rotor assembly, while the rotor element (the enveloping element) 33 is being heated, the phenolic resin layer can absorb a lot of heat from the rotor element 33 to reduce thermal effect on the shaft (the enveloped element) 34, and thus the time allowed for assembling/disassembling operations can be extended. In disassembling the rotor assembly, the rotor element 33 can be reheated such that the rotor element together with its bore is expanded. The high thermal resistivity layer can hinder the heat of the rotor element 33 being transferred to the shaft 34, so that thermal expansion of the shaft 34 can be mitigated, and thus the shaft 34 can be easily separated from the rotor element 33. However, for a conventional rotor assembly, when the rotor element is heated, the shaft can expand simultaneously with the rotor element, which causes the shaft difficulty being pulled out of the rotor element. Furthermore, the shaft may suffer distortion or skewness after the motor has been used for a period of time, which further increases difficulty dismantling the rotor assembly. With the present invention, the foregoing problem can be solved.

Figure 6:
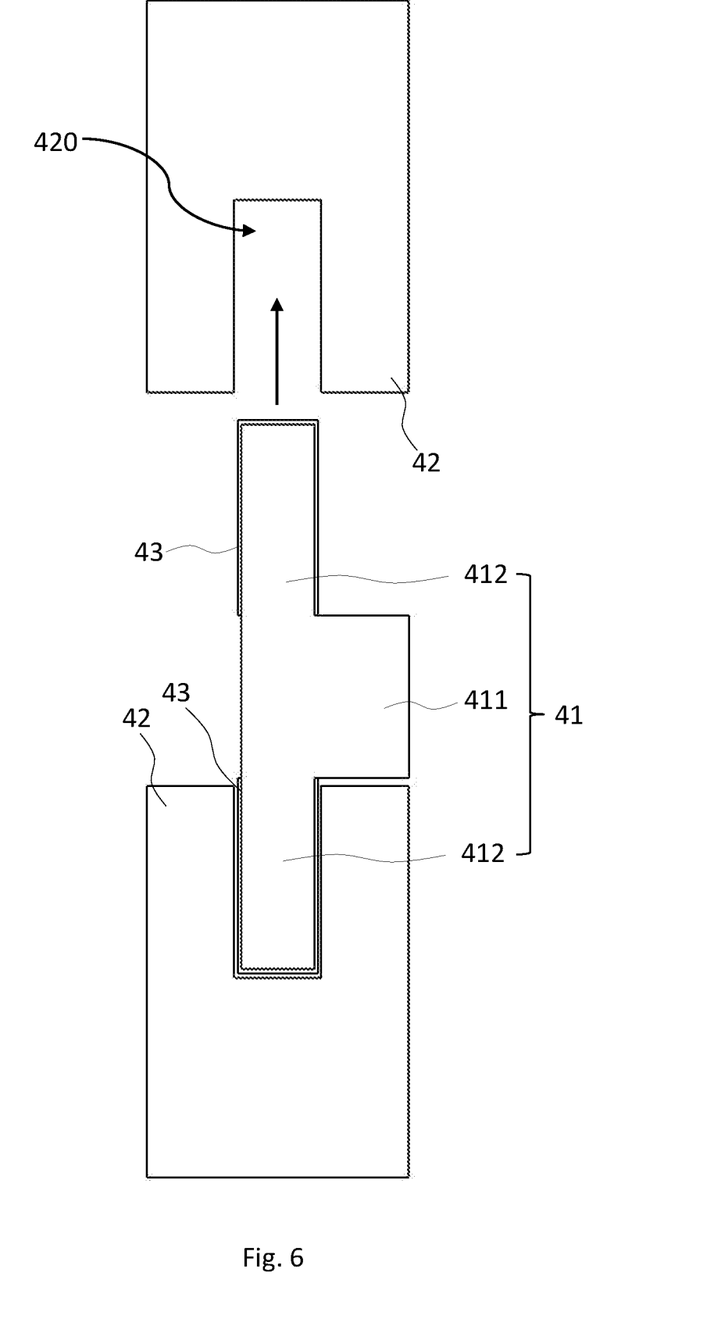
FIGS. 6 through 8 show schematic views of a third embodiment of the structure formed by temperature.
Figure 7:
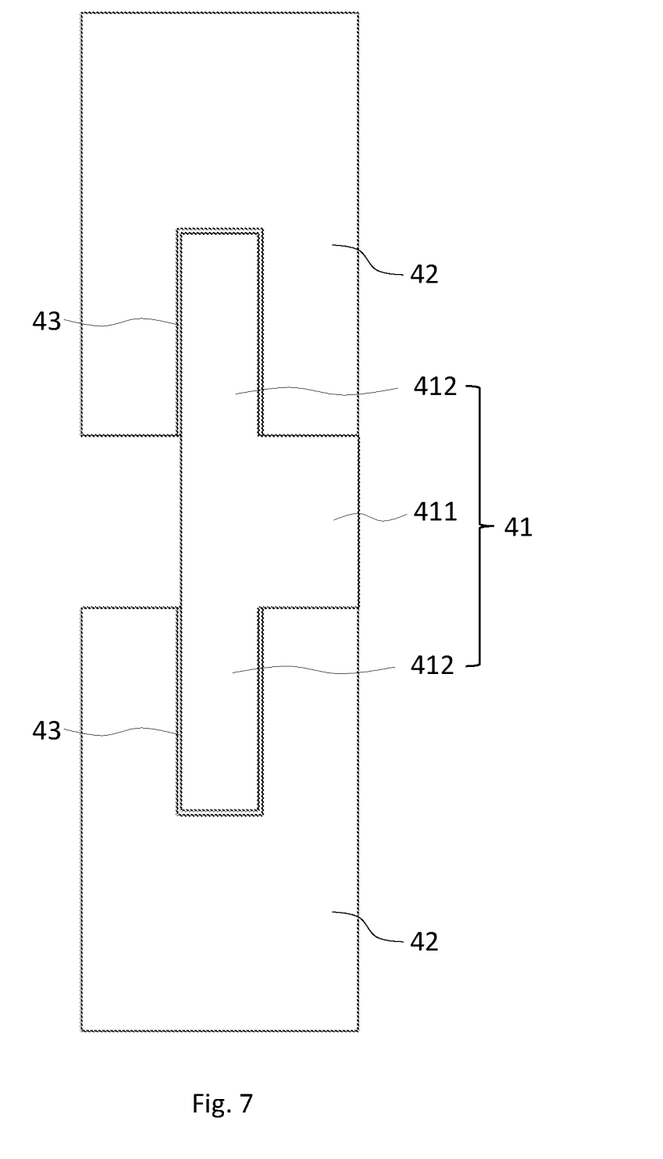
Figure 8:
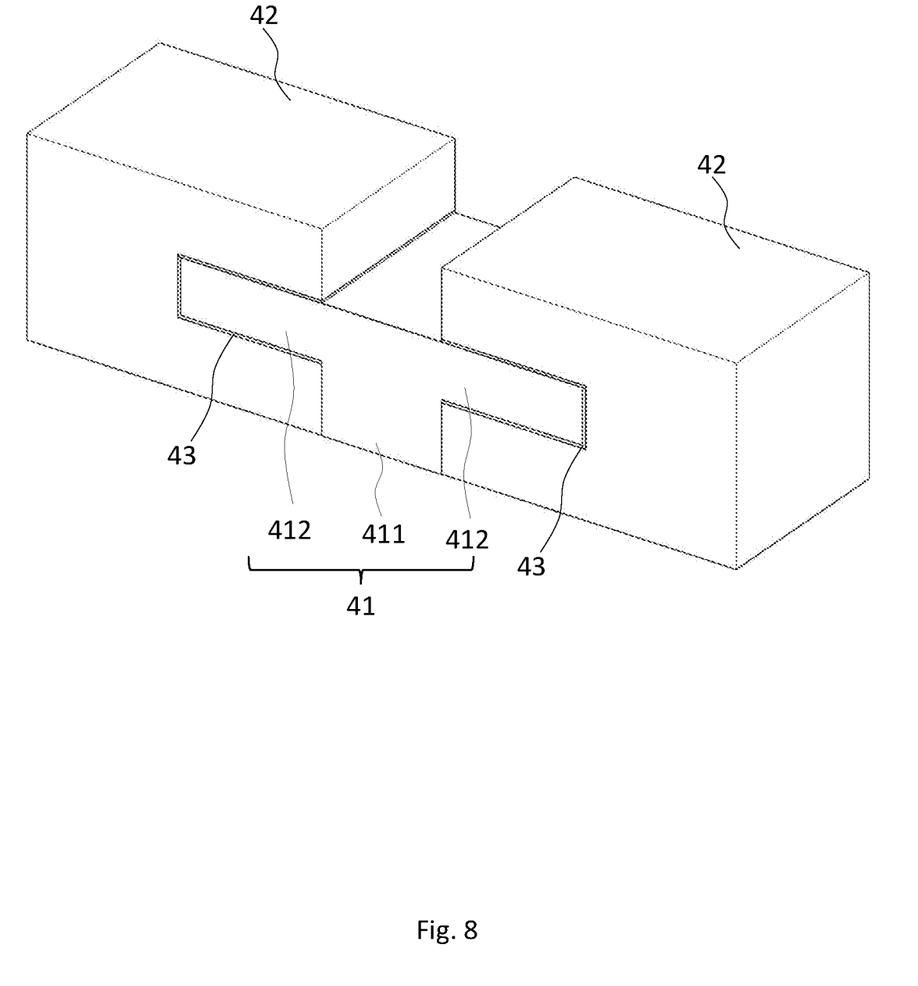

Of course, those skilled in the art can understand that, in the present invention, the engagement section of the enveloped part is not limited to be cylindrical, and it is possible to have more than one enveloping part to construct a structure. FIGS. 6 through 8 show a third embodiment of the structure formed by temperature difference, wherein the structure comprises an enveloped part 41 and two enveloping parts 42. The enveloped part 41 has a central free section 411 and two engagement sections 412 respectively extending from two opposite sides of the central free section. Each enveloping part 42 defines a holding space (rectangular recess) corresponding to one of the two engagement sections 412 of the enveloped part 41. A low heat transfer layer 43, which can be formed of synthetic rubber, is disposed in the holding space, between the enveloping part and one corresponding engagement section 412.

When the enveloping part 42 is heated to reach a predetermined temperature over the enveloped part 41, each holding space of the enveloping part 42 is expanded such that the corresponding engagement section together with the low heat transfer layer is allowed to move into or from the recess, as shown in FIG. 6. After the enveloping part 42 having been heated is cooled, the two holding spaces 420 can shrink to their original size, causing the enveloping parts 42 to tightly hold the engagement sections 412 of the enveloped part 41, as shown in FIGS. 7 and 8. For dismantling the structure, the enveloping parts 42 can be reheated to reach the predetermined temperature difference over the enveloped part 41, wherein the two holding spaces 420 can be expanded by heat, whereas the low heat transfer layers 43 can reduce thermal conduction between the enveloped part 41 and the two enveloping parts, so that thermal expansion of the enveloped part 41 can be mitigated. As a result, the holding space of each enveloping part 42 is larger than the corresponding engagement section 412, and thus the enveloped part 41 can be easily separated from the two enveloping parts 42.

Figure 9:
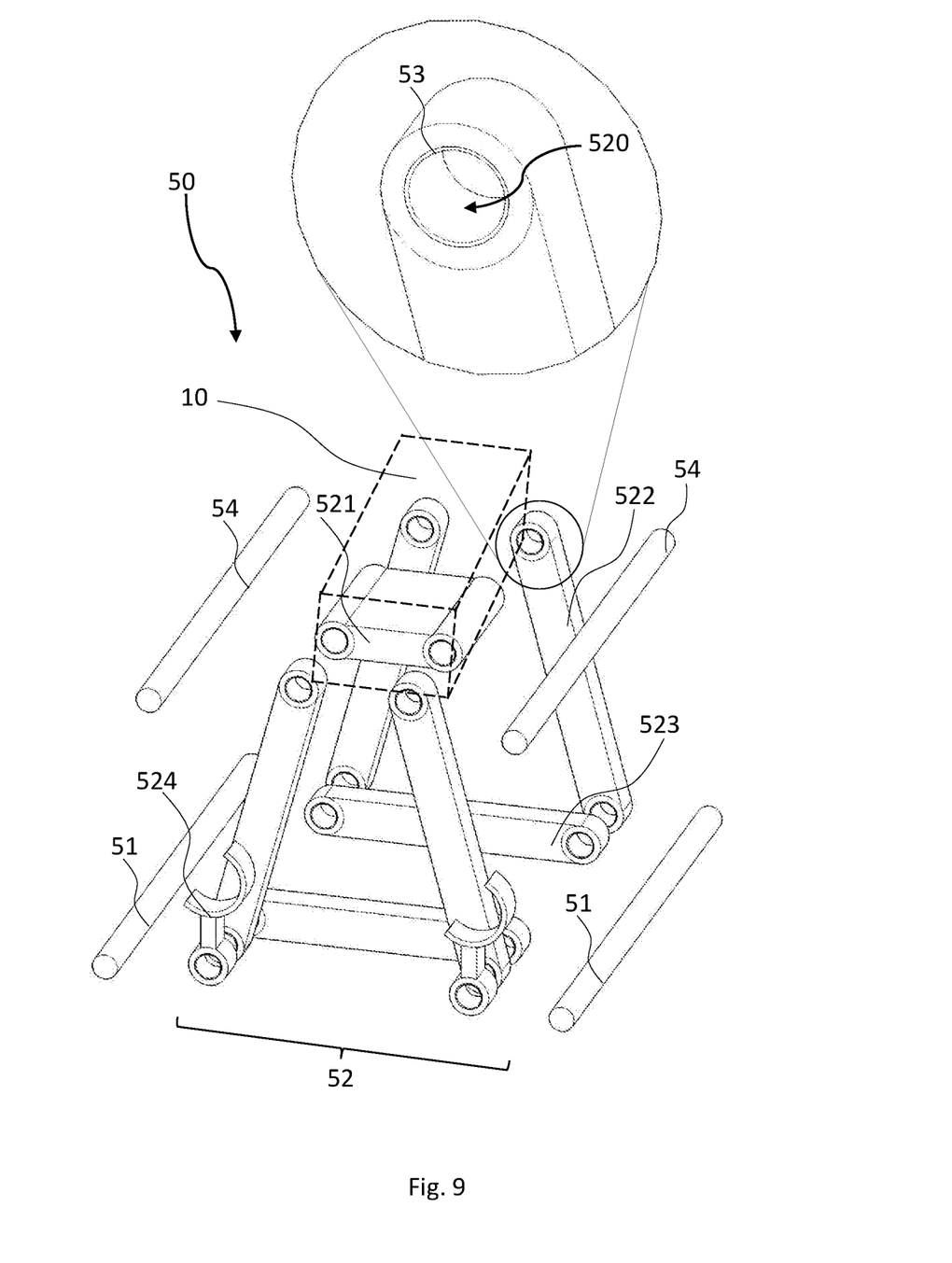
FIG. 9 show a 3-dimensional view of a first embodiment of a lightweight rigid assembly according to the present invention, which is based on the structure formed by temperature difference.

In addition to the structures of the foregoing embodiments, a lightweight rigid assembly can be constructed by using a plurality of enveloping parts and a plurality of enveloped parts, as shown in FIG. 9, wherein the rigid assembly 50 can be used as a box for accommodating a battery pack of an electric vehicle, which has a weight amounted to 500 kilograms, which is far more than that of the battery pack used in a fossil-fuel car, which has a weight of about 100-200 kilograms. For supporting the battery pack on an electric vehicle, the box should have an adequate strength. However, this may significantly increase the weight of the vehicle and therefore reduce the performance of acceleration and endurance of the vehicle.

For an electric vehicle, if the battery pack is not protected and fixed properly, some cells may be damaged to cause short circuits therein, and thus a lot of energy can be released to cause the cells to expand and squeeze each other. As a result, the electrolyte contained in the cells may leak and cause other cells short circuits. Due to a lot of energy being released from the cells in a short space of time, burning or even explosion may occur. Thus, it is preferred for the battery pack to be fully protected therearound, so that the left, right, front, and rear sides, and the top and bottom of the battery pact can resist impact, but this may significantly the weight of the vehicle. The lightweight rigid assembly of the present invention can solve the problem.

As shown, the lightweight rigid assembly 50 comprises two lower enveloped parts 51, two upper enveloped parts 54, an enveloping group 52, and a plurality of low heat transfer layers 53. The enveloped parts 51, 54, which each are in the form of a shaft, can be assembled with the enveloping group 52 to form a closed support frame. The enveloping group 52 includes a top enveloping part 521, four substantially upright enveloping parts 522, two bottom enveloping parts 523, and two auxiliary enveloping parts 524. The top enveloping part 521, which is in the form of a plate, can be used to fix a battery module thereon. The substantially upright enveloping parts 522, the bottom enveloping parts 523, and the lower enveloped parts 51 can share the weight of a battery pack, wherein the substantially upright enveloping parts 522 are subject to compressive forces, while the bottom enveloping parts 523 and the lower enveloped parts 51 are subjected to stretched forces.

Since the low heat transfer layers 53 are disposed between the enveloping group 52 and the enveloped parts 51, 54, thermal conduction therebetween can be mitigated. For modifying the rigid assembly 50, the enveloping group 52 can be heated to enlarge one or more holding spaces 520, so that the enveloped parts 51, 54 can be removed from the assembly and replaced with a new one. For increasing the strength of the rigid assembly 50, more enveloping groups can be used. Another feature of the rigid assembly 50 is that the auxiliary enveloping parts 524 are adjustable and can be used to support coolant pipes for a battery pack. Therefore, welding or fastening other components for that purpose can be dispensed with.

In FIG. 9, the low heat transfer layers 53 are provided at inner surfaces of the enveloping parts of the enveloping group 52 that define the holding spaces 520. Alternatively, the low heat transfer layers 53 can be formed of a phase change material such as tin, so that when the enveloped parts 54 are assembled with the top enveloping part 521 and the substantially upright enveloping parts 522, the low heat transfer layers 53 can be melted by absorbing the heat transferred from the enveloping parts to the enveloped parts 54, thus stopping the temperature of the enveloped parts 54 from rising, so that longer operation time is permitted. Furthermore, the melted material can fill the gaps between the corresponding parts to increase electric conductivity therebetween, and thus the parts can serve as a common ground for the cells of the battery pack.

In view of this embodiment, types of parts can be significantly reduced. A support frame can be easily constructed by assembling parts according to this embodiment to be suitable for an application, thus increasing applicability. In the process of assembling/disassembling a frame, any part thereof can be adjusted or changed easily, thus increasing the efficiency of the process. A frame being constructed according to this embodiment is robust but its weight is light, which can be used as a main frame or door of a vehicle, a battery support frame for an electric vehicle, and even applied in an aircraft or a bridge for a structural support.

Figure 10:
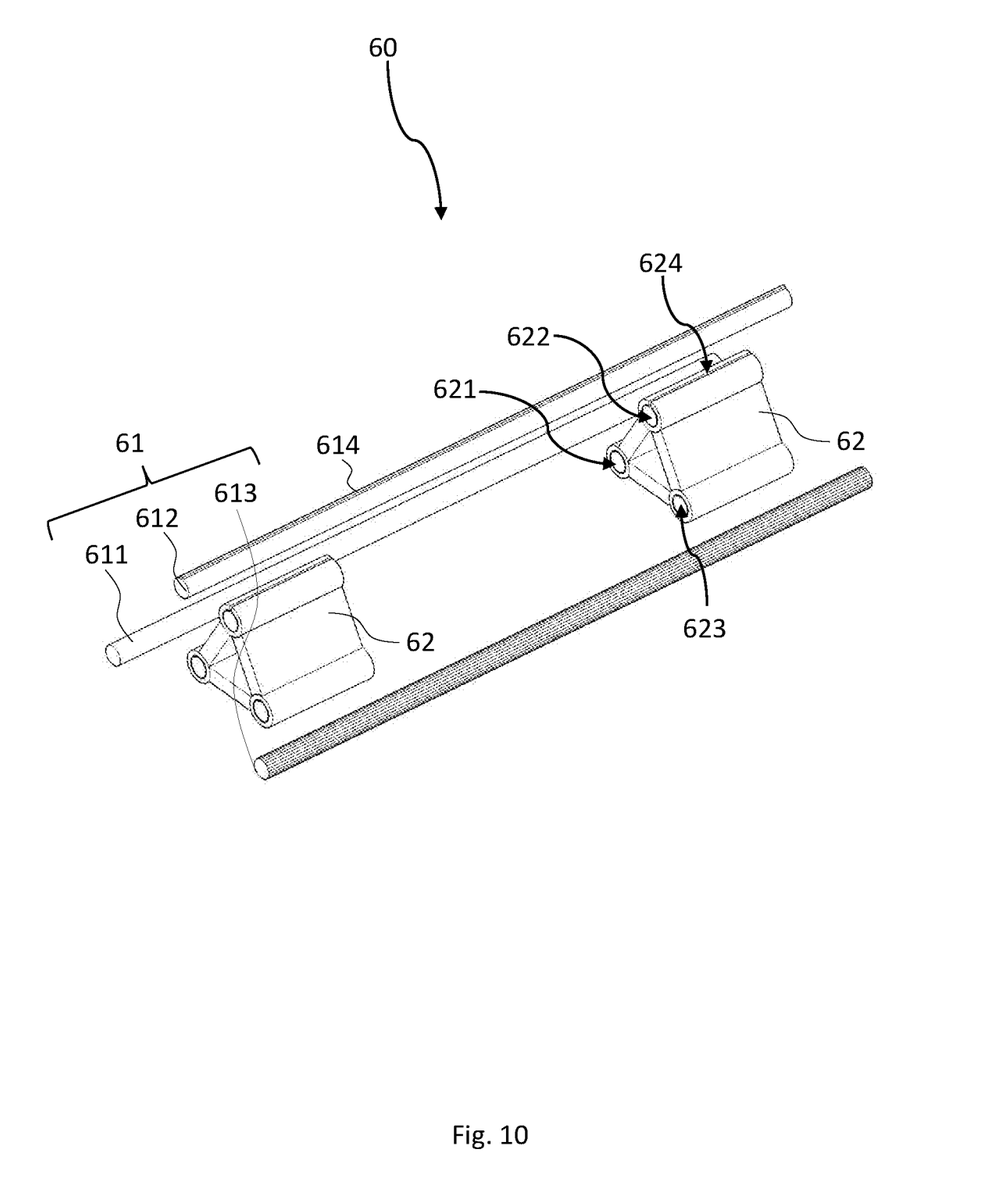
FIG. 10 show a 3-dimensional view of a second embodiment of the lightweight rigid assembly, which is based on the structure formed by temperature difference.

FIG. 10 shows a second embodiment of the rigid assembly of the present invention. The rigid assembly 60 comprises an enveloped group 61 and two enveloping parts 62. The enveloping parts 62 are in the form of a triangle structure and each define three holding spaces (holes) 621, 622, 623, wherein a slot 624 is defined at each of the enveloping parts 62 to communicate with a holding space 622. Each enveloping part 62 is provided with three low heat transfer layers respectively in the holding spaces 621, 622, 623. The enveloped group 61 includes a first enveloped part 611, a second enveloped part 612, and a third enveloped part 613, which are generally in the form of a cylindrical body but slightly different in some aspect. The first enveloped part 611 corresponds to the holding space 621. The second enveloped part 612 corresponds to the holding space 622 and has an elongated projection 614 corresponding to the slot 624. As the second enveloped part 612 is inserted into the holding space 622, the elongated projection 614 can be engaged with the slot 624, which allows the second enveloped part 612 to be assembled with the two enveloping parts 62 more firmly. The third enveloped part 613 corresponds to the holding space 623 and has finely holding spaced ridges formed thereon, whereby the assembled strength between the third enveloped part 613 and the enveloping parts 62 can be increased.

In view of the foregoing, the structure of the present invention employs a low a heat transfer layer between an enveloped part and an enveloping part to reduce thermal conduction therebetween. Thus, by heating the enveloping part, the thermal expansion rate of the enveloping part is greater than that of the enveloped part, so that the enveloped part can be easily separated from the enveloping part. Furthermore, the present invention discloses a method for dismantling a structure, which allows an enveloped part to be quickly separated from an enveloping part to solve the difficulty of conventional technology in separating parts. Furthermore, the present invention provides a robust, lightweight rigid assembly, which is constructed of a plurality of enveloping parts and a plurality of enveloped parts, wherein a plurality of low heat transfer layers are disposed between the enveloping parts and the enveloped parts. Furthermore, in the present invention, low heat transfer layers can be formed of a suitable material to avoid corrosion due to galvanic cell existing between two dissimilar metals. Moreover, the lightweight rigid assembly can be constructed such that the constituting parts thereof are electrically insulated or conductive with each other.

Furthermore, the enveloping parts and the enveloped parts disclosed in the present invention are not limited to be metal parts. Any materials with characteristics of thermal expansion and cold shrinkage, such as carbon fiber or resin, can be used as well. In addition to high thermal resistivity, the low heat transfer layers used in the present invention can have a high electrical resistance so that, after assembling a structure, the enveloping parts can be electrically insulated from the enveloped parts. As such, when electronic components placed on a rigid assembly being constructed that way can be prevented from damages due to short circuits.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

What is claimed is:

1. A structure formed by temperature difference, comprising:
an enveloped part having a free section and an engagement section extending from the free section;

an enveloping part defining at least one holding space fitting to the engagement section of the enveloped part, the holding space being dimensioned to be less than the engagement section of the enveloped part, wherein the holding space is thermally expanded to be larger than the engagement section of the enveloped part by heating the enveloping part to reach a predetermined temperature difference over the enveloped part, so that the engagement section of the enveloped part is movable into or from the holding space, and wherein when the enveloping part is cooled, the holding space shrinks to its original size, causing the enveloping part to tightly hold the engagement section of the enveloped part; and a low heat transfer layer disposed in the holding space, between the engagement section of the enveloped part and the enveloping part, the low heat transfer layer having a thermal conductivity less than each of the enveloped part and the enveloping part; whereby the low heat transfer layer reduces heat transferred from the enveloping part to the enveloped part, thus facilitating the enveloping part being heated to reach the predetermined temperature difference over the enveloped part;

wherein the low heat transfer layer is formed of a material having a melting point lower than an operating temperature, whereby when the enveloping part is heated to a temperature greater than the operating temperature, the material absorbs heat transferred from the enveloping part and experiences a phase change thereof to stop temperature from rising, thus facilitating the enveloping part being heated to reach the predetermined temperature difference over the enveloped part.

2. The structure of claim 1, wherein the enveloped part is in a form of a cylindrical body whereas the holding space of the enveloping part is in the form of a cylindrical hole having a radius less than a sum of the radius of the cylindrical body and a thickness of the low heat transfer layer.

3. The structure of claim 1, wherein the low heat transfer layer is formed on an outer surface of the engagement section of the enveloped part.

4. The structure of claim 1, wherein the low heat transfer layer is formed on an inner surface that defines the holding space of the enveloping part.

5. The structure of claim 1, wherein the low heat transfer layer is formed of a material having a thermal resistivity greater than each of the enveloped part and the enveloping part.

6. An assembly, comprising:
a plurality of enveloped parts, each of which has a free section and an engagement section extending from the free section;

a plurality of enveloping parts, each of which defines a holding space fitting to the engagement section of one of the enveloped parts, the holding space being dimensioned to be less than the engagement section of one of the enveloped parts, wherein the holding space is thermally expanded to be larger than the engagement section of one of the enveloped parts by heating one of the enveloping parts to reach a predetermined temperature difference over one of the enveloped parts, so that the engagement section of one of the enveloped parts is movable into or from the holding space, and wherein when one of the enveloping parts is cooled, the holding space shrinks to its original size to have one of the enveloping parts tightly hold the engagement section of one of the enveloped parts; and a plurality of low heat transfer layers, each of which is disposed in said respective holding, between one of the enveloped parts and one of the enveloping parts which are fitting together, each said low heat transfer layer having a thermal conductivity less than the enveloped parts and the enveloping parts, so that each said low heat transfer layer reduces heat transferred from the enveloping parts to the enveloped parts, thus facilitating the enveloping parts being heated to reach the predetermined temperature difference over the enveloped parts;

wherein the enveloped parts and the enveloping parts are configured to form a three-dimensional support frame;

wherein each of the low heat transfer layers is formed of a material having a melting point lower than an operating temperature, whereby when one of the enveloping parts is heated to a temperature greater than the operating temperature, the material absorbs heat transferred from one of the enveloping parts and experiences a phase change thereof to stop temperature from rising, thus facilitating the enveloping parts being heated to reach the predetermined temperature difference over the enveloped parts.

7. The assembly of claim 6, wherein the three-dimensional support frame includes at least one enclosed sub-frame formed by some of the enveloped parts and the enveloping parts.

8. The assembly of claim 6, wherein each of the enveloping parts and the enveloped parts has a same thermal conductivity, and each of the low heat transfer layers has the thermal conductivity lower than each of the enveloping parts and the enveloped parts.

9. The assembly of claim 6, wherein the low heat transfer layers are formed of a material having a thermal resistivity greater than the enveloped parts and the enveloping parts.

* * * * *